Patented May 31, 1949

2,471,928

UNITED STATES PATENT OFFICE 2,471,928

PREPARATION OF METHACRYLONITRILE

Newman M. Bortnick and George W. Cannon, Philadelphia, Pa., assignors to Rohm & Haas Company, Philadelphia, Pa., a corporation of Delaware No Drawing. Application December 18, 1947, Serial No. 792,599

18 Claims. (Cl. 260—465.9)

This invention relates to a method for preparing methacrylonitrile. More particularly, it deals with the preparation of methacrylonitrile from isobutylene by reacting said hydrocarbon with nitrosyl chloride to form a dimeric addition product therefrom, treating said addition product with a molten salt of an amine and an inorganic acid at about 110° C. to about 350° C., collecting the vapors resulting therefrom, and separating methacrylonitrile.

The reaction of nitrosyl chloride with isobutylene occurs readily at temperatures of about 30° C. down to —15° C. or even lower. The reaction may be effected directly or in a solvent, such as a petroleum solvent, chloroform, chlorobenzene, etc. A white solid forms along with a blue liquid. The solid upon analysis appears to be a dimer composed of equimolecular proportions of isobutylene and nitrosyl chloride. The solid may readily be separated and, if so desired, rinsed free of any blue liquid adhering to it by means of naphtha or other inert organic solvent.

When the dimer is added to a molten amine salt, it is decomposed with formation primarily of methacrylonitrile. This decomposition appears to progress through methacrolein oxime, which is, in turn, converted at the temperatures of operation to the desired methacrylonitrile. From the vapors, there is readily separated a crude methacrylonitrile which may be readily purified.

To form an amine salt which is used for the cracking of the isobutylene-nitrosochloride dimer, there may be used any of the strong non-oxidizing inorganic acids, such as hydrochloric, hydrobromic, sulfuric, toluene sulfonic, phosphoric, or the like. The salts formed by these acids are relatively non-volatile at cracking temperatures.

Typical amines which are used in the form of their acid salts are pyridine, the lutidines, collidines, and picolines, quinoline, and other alkylated heterocyclic amines, whether crude or refined, aniline, monomethylaniline, morpholine, the various alkyl amines, including methyl, ethyl, butyl, amyl, diamyl, dibutyl, dioctyl, di-2-ethylhexyl, benzyldimethyl, octadecyl, octadecyldimethyl, dodecyl, or dodecyldimethyl amines, cyclohexyl, dicyclohexyl, or other amine. Amine salts may be separately prepared and added to the dimer, or the dimer may be added to the amine salts.

In the case of the less volatile amines, the free amine may be used, as the hydrochloride is rapidly formed therefrom during cracking of the dimer. In one method of operation, some amine salt is used at the start in the reaction vessel and free amine is added along with the dimer to be cracked. The added amine is, of course, converted to the salt thereof and the salt tends to accumulate in the reaction vessel.

Any monoamine may be used which forms acid salts which are relatively stable at reacting temperatures. The amines which are preferred are tertiary amines and, of these, those which boil, as free amines, at temperatures above 100° C. are particularly desirable. Even in the case of such amines, some amine salt is carried by vapors from the cracking reaction and must be separated from the products. The amine may be recovered and reused.

If the molten amine salts become contaminated after use, they may be purified through forming the free amines from which the amine salts are again formed.

The cracking or decomposition of the dimeric addition product in the presence of a molten amine salt begins below 110° C. and becomes increasingly more rapid as the temperature is raised. The upper temperature is determined primarily by the point at which excessive transfer of base catalyst from the cracking or reaction unit is encountered. With the less volatile amines, this temperature lies above 250° C., but the practical upper temperature is about 350° C. Higher temperatures may be used, however, with special methods of operation, such as "flash" heating, and with replenishment of amine. The preferred temperature range is 150° to 275° C. With preferred amine salts, such as those from heterocyclic amines as, for instance, the various pyridines, including pyridine itself, picolines, lutidines, and collidines, and the quinolines, including quinoline itself, isoquinoline, and the alkylated quinolines and isoquinolines, the operating temperatures are desirably from about 220° to about 240° C. The process may be practiced under normal pressures or other pressures which permit operation within the above ranges of temperature.

Since the reaction is definitely exothermic, the reaction should be controlled, as by rate of addition of dimer to the molten amine salt and/or by internal or external cooling. Internal cooling may be effected, for example, by running water into the molten reaction medium along with the solid dimer. This procedure has been found not to reduce the yield.

In adding dimer to molten amine salt, it is desirable to add the dimer thereto without permitting it to come into direct contact with the hot walls of the reaction vessel. The dimer is thus preferably introduced into the molten salt and stirred with it. Mechanical stirring is not, however, essential, as satisfactory yields have been obtained when the dimer was dropped onto the surface of the molten salt, without mechanical stirring, or run into the amine salt as a slurry made with an amine or a high-boiling solvent, such as naphtha. Relatively satisfactory yields have been obtained over a wide range of rates of addition of dimer to molten salt.

The vapors which are obtained from the above cracking reaction or pyrolysis of the dimer in the presence of an amine salt may be condensed on a cool surface. The condensate yields two layers, an oil layer and an aqueous layer. Some amine salts swept along by the vapors may be found in the water layer, while methacrylonitrile is the principal component of the oil layer. Some β-chloroisobutyronitrile is also found in the oil layer and this is a further source of methacrylonitrile, which is readily obtained therefrom by reaction with an alkali, thereby increasing the ultimate yield of the desired product.

Considerable hydrogen chloride is found in both layers. The latter is removed with an alkali, such as sodium hydroxide in aqueous solution.

After the oil layer has been neutralized, it may be worked up by distillation. In one convenient method of purification, the crude product is distilled through a packed column. The oil layer is desirably treated with a sodium bicarbonate solution during distillation. This effectively decomposes any β-chloroisobutyronitrile. The product may be further purified from a low-boiling impurity containing a carbonyl group by shaking it with a strong bisulfite solution and washing with water. The washed product may be dried over an anhydrous salt such as potassium carbonate. A final distillation gives highly pure methacrylonitrile. This product has been used for calculation of yields.

Further details of methods of carrying out this invention are given in the following examples.

Example 1

Reaction apparatus was prepared from a two-liter sidearm distilling flask, fitted through side ports with a small stirrer, with a thermometer, and with a separatory funnel for admitting catalyst or water. At the head of the flask was fitted a conical hopper equipped with a disc in which a slot had been cut with an uplifted edge which served as a plow. A wire stirrer in the conical hopper served to prevent bridging of the solid dimer placed therein.

A charge of 220 grams of pyridine hydrochloride was placed in the reaction flask. This presented a surface of about 180 square centimeters. In the hopper was placed a charge of six hundred grams of bis(isobutylene nitrosochloride). The pyridine hydrochloride was heated to 220° C. and the dimer continuously added thereto. The rate of feed was calculated to give 174 liters per hour of product as vapor (at normal pressure and temperature). The temperature during the reaction was maintained between 220° C. and 233° C.

The vapors formed were taken off through the side arm and condensed. A 20% sodium hydroxide solution was added to the condensate until it was neutral. Oil and aqueous layers were then separated. The oil layer was shaken with a strong metabisulfite solution and washed twice with water. It was then distilled through a packed column in the presence of ninety grams of sodium bicarbonate and one hundred grams of water. The column was operated without reflux until the temperature of the vapor reached 85° C. It was then operated at total reflux. The vapor temperature dropped to 75° C. Thereupon, distillate was taken off. The pot temperature at the end of the distillation approached 120° C. From the pot, there was recovered much of the pyridine which had been carried over during the cracking reaction. This first distillate was treated with a trace of β-naphthol and was again distilled, this time through an eighteen-inch packed column. A forecut contained the residual water of the first distillate. The main fraction was taken off at 89°–91° C. It was methacrylonitrile of high purity in a yield of 62.7%.

Example 2

With the apparatus described in Example 1, there was used a commercial pyridine in the form of its toluene sulfonic acid salt. The crude product was worked up by neutralization, distillation with sodium carbonate solution, extraction with sodium bisulfite solution, water washing, drying over potassium carbonate, and careful fractionation. A yield of 53% of pure methacrylonitrile was obtained.

In place of the pure pyridine of Example 1 or the commercial pyridine of Example 2, there may be used the various crude pyridines of commerce which are mixtures of pyridine itself, lutidines, and other alkylated cyclic amines. Other acids than hydrochloric or toluene sulfonic may be used to form the acid salts. Reactions have been carried out with the bisulfate, the phosphate, and other salts. In place of the cyclic amines, there may be used other amines. For example, trimetylamine hydrochloride gave a yield of 50% to 60% of pure methacrylonitrile by the above procedures. A yield of over 40% was obtained with di-2-ethylhexylamine hydrochloride. Octadecylamine salts tended to foam but were otherwise effective catalysts.

Example 3

The apparatus described above was charged with 230 grams of a crude pyridine hydrochloride, and there was placed in the hopper six hundred grams of dimer which had been prepared by running nitrosyl chloride into a chilled solution (0° C.) of isobutylene in petroleum ether, followed by separation of the precipitated dimer by filtration. When the pot temperature was raised to 210° C., addition of dimer was begun. It was added at about two and a half times the rate used in Example 1. When the temperature reached 240° C., water was run into the molten amine salt in an amount to maintain the temperature below 240° C. When the crude product was purified as above, a yield of 66.3% of pure methacrylonitrile was obtained.

Example 4

The general procedure of Example 3 was followed except the rate of addition of dimer was approximately doubled and about twice the amount of water previously used was added to keep the temperature below 242° C. The yield of primary product was over 60% without reference to the methacrylonitrile which could have been recovered from various fractions, etc.

Example 5

Apparatus was constructed for introducing the dimer of isobutylene and nitrosyl chloride in the form of a slurry. The apparatus consisted of a round-bottomed flask, at the bottom of which there was welded a cylinder, at the base of which there was attached a small tube through which a slurry of dimer in an inert solvent was pumped into the apparatus. Stirring of material within the apparatus was obtained by circulating liquid through a side tube, welded into the flask, which connected with a vertical tube containing a propeller mechanically operated from above. This propeller forced material down the vertical tube and through connecting tubing into the cylinder at the base of the flask.

In the cylinder and flask was placed amine hydrochloride, which was then heated. Slurry was pumped into the molten amine salt, the reaction mixture was circulated through the side tube, and vapors were taken off at the top of the flask.

About a kilogram of technical mixed lutidines was converted to the hydrochlorides and placed in the reaction vessel. The temperature thereof was then raised to 210° C. and a slurry of about equal parts by weight of isobutylene-nitrosochloride dimer and a high-boiling naphtha pumped in. The reaction mixture was kept in constant circulation. The temperature of the mixture remained below 221° C. throughout the addition of 1168 grams of dimer. Vapors were taken from the reaction vessel and condensed to give an aqueous and an oil layer. The layers were separated. The oil layer was washed with a caustic soda solution, with a strong sodium metabisulfite solution, distilled counterconcurrently to a sodium bicarbonate solution, and redistilled. A yield of 79% of methacrylonitrile was obtained.

*Example 6*

The procedure of Example 5 was followed with use of 1116 grams of a mixture of β- and γ-picolines as the amine converted to the amine hydrochloride. A slurry of equal parts by weight of dimer and a naphtha distilling at 110°-190° C. was introduced into the picoline salts at 219°-225° C. The dimer was added at the rate of 1120 grams per hour. A yield of almost 78% of theory was obtained of purified methacrylonitrile.

*Example 7*

The procedure of Examples 5 and 6 were followed with substitution of 912 grams of 2,4-lutidine for the previously used amines. In the course of fifty-nine minutes, 1169 grams of the dimer was introduced. The temperature was held at 220°-225° C. The vapors from the reaction vessel were condensed, and the desired methacrylonitrile separated as above in a yield of 517 grams, corresponding to over 80% of theory.

*Example 8*

A crude mixture of picolines, lutidines, and collidines was converted to the hydrochloride form and about one kilogram thereof placed in the apparatus described in Example 5. The temperature of the amine hydrochlorides was raised to about 220° C., and a 50% slurry of bis(isobutylene-nitrosochloride) in high-boiling naphtha was pumped into the molten amine salt. Along with the slurry, there was added the crude mixture of amines. At the end of four and a quarter hours, there had been thus introduced 1140 grams of the free amines and 9728 grams of the 50% slurry. The level in the reaction vessel was maintained by withdrawal of liquid. The products of the reaction were collected and worked up as before. The yield of methachylonitrile was 84.3%.

By the methods described above, there have been used other amines as catalysts. Included among these are quinoline, isoquinoline, quinaldines, and mixtures of various amines. The most satisfactory catalysts are the tertiary amines which boil from 115° to 250° C.

While, theoretically, the role of the amine salt is that of a catalyst, there is a practical limit on the amount of dimer which is efficiently converted to methacrylonitrile by a given amount of an amine salt. This is due to an accumulation of decomposition products with the amine salts. It has been found, for example, that in procedures where the dimer is run into hot amine salt, ten to twenty equivalents of the isobutene-nitrosyl chloride dimer per mole of amine can be converted to methacrylonitrile with good efficiency. As decomposition or by-products accumulate, it becomes more difficut to stir or to circulate the reaction mixture or to intermingle amine salt and dimer. Hence, it becomes desirable either to replace the batch of amine salts completely from time to time or to take off amine salt at regular and frequent intervals or continuously, with replacement thereof with fresh amine or amine salt.

The proportion of amine or amine salt actually present in a reaction mixture at any given time may vary from about one mole of amine salt per two moles of the dimer up to an exceedingly large excess of amine salt per mole of the dimer. This proportion depends upon the particular method of operation employed. Where dimer is run into a molten amine salt, the ratio of amine salt to dimer present at any given instant approaches infinity.

The method herein described makes possible the production of highly pure methacrylonitrile by starting from petroleum from which, by well-known methods, isobutylene may be prepared. The isobutylene need not be especially pure, for, by reaction with nitrosyl chloride, a dimeric addition product is obtained and separated. This product is converted with amine salts as catalysts to the desired methacrylonitrile in satisfactory yields. The methacrylonitrile serves as a valuable raw material for the preparation of methacrylic amides, esters, salts, and the like, which yield important plastics useful in a great many fields.

We claim:

1. A process for preparing methacrylonitrile which comprises decomposing the dimeric addition product of isobutylene and nitrosyl chloride by treating it at a temperature between 110° and 350° C. with an amine, whereby methacrylonitrile is formed, and separating the methacrylonitrile.

2. A process for preparing methacrylonitrile which comprises decomposing the dimeric addition product of isobutylene and nitrosyl chloride by treating it at a temperature between 110° and 350° C. with an amine boiling above 100° C., whereby methacrylonitrile is formed, and separating the methacrylonitrile.

3. A process for preparing methacrylonitrile which comprises decomposing the dimeric addition product of isobutylene and nitrosyl chloride by heating it at a temperature between 110° C. and 350° C. in the presence of an amine in the form of a salt, collecting the vapors resulting from said decomposition, and separating therefrom methacrylonitrile.

4. A process for preparing methacrylonitrile which comprises adding the dimeric addition product of isobutylene and nitrosyl chloride to the molten salt of an amine and a strong inorganic acid at a temperature between 110° and 350° C., whereby the said addition product is decomposed and methacrylonitrile is formed, and separating the methacrylonitrile.

5. A process for preparing methacrylonitrile which comprises decomposing the dimeric addition product of isobutylene and nitrosyl chloride by heating it at a temperature between 150° C. and 275° C. in the presence of an amine salt and separating from the resulting decomposition products methacrylonitrile.

6. A process for preparing methacrylonitrile which comprises heating the dimeric addition product of isobutylene and nitrosyl chloride at a temperature between 150° C. and 275° C. in the presence of a salt of a tertiary amine boiling between 115° C. and 250° C., whereby said addition product is decomposed and methacrylonitrile is formed, and separating the methacrylonitrile.

7. The process of claim 6 wherein the amine is in the form of an amine hydrochloride.

8. A process for preparing methacrylonitrile which comprises decomposing the dimeric addition product of isobutylene and nitrosyl chloride by heating it at a temperature between 110° C. and 275° C. in the presence of a heterocyclic tertiary amine boiling above 115° C., whereby said addition product is decomposed and methacrylonitrile is formed, and separating the methacrylonitrile.

9. The process of claim 8 wherein the tertiary amine is a lutidine.

10. The process of claim 8 wherein the tertiary amine is in the form of an amine hydrochloride.

11. A process for preparing methacrylonitrile which comprises forming a slurry of the dimeric addition product of isobutylene and nitrosyl chloride in naphtha, treating said slurry at a temperature between 110° C. and 275° C. with an amine salt, whereby methacrylonitrile is formed, and separating the methacrylonitrile.

12. The process of claim 11 wherein the amine is a tertiary amine boiling between 115° C. and 250° C.

13. The process of claim 12 wherein the amine salt is an amine hydrochloride.

14. The process of claim 12 wherein the amine is a tertiary heterocyclic amine.

15. A process for preparing methacrylonitrile which comprises decomposing the dimeric addition product of isobutylene and nitrosyl chloride by heating it between 150° C. and 275° C. with trimethylamine hydrochloride, whereby methacrylonitrile is formed, and separating the methacrylonitrile.

16. A process for preparing methacrylonitrile which comprises decomposing the dimeric addition product of isobutylene and nitrosyl chloride by heating it between 150° C. and 275° C. with the salt of a pyridine base, whereby methacrylonitrile is formed, and separating the methacrylonitrile.

17. The process of claim 16 wherein the pyridine base is a lutidine.

18. A process for preparing methacrylonitrile which comprises decomposing the dimeric addition product of isobutylene and nitrosyl chloride by heating it between 150° C. and 275° C. with the salt of a quinoline base, whereby methacrylonitrile is formed, and separating the methacrylonitrile.

NEWMAN M. BORTNICK.
GEORGE W. CANNON.

REFERENCES CITED

The following references are of record in the file of this patent:

UNITED STATES PATENTS

| Number | Name | Date |
|---|---|---|
| 2,234,566 | Lazier et al. | Mar. 11, 1941 |
| 2,328,984 | Lichty | Sept. 7, 1943 |
| 2,375,005 | King | May 1, 1945 |
| 2,385,550 | Spence | Sept. 25, 1945 |
| 2,394,430 | Crowder | Feb. 5, 1946 |
| 2,404,280 | Dutcher | July 16, 1946 |
| 2,417,024 | Tuerck et al. | Mar. 4, 1947 |

OTHER REFERENCES

Tilden et al., J. Chem. Soc. (London), vol. 65, pp. 324, 325, 326, 333 (1894).

Drew et al., J. Chem. Soc. (London), 1934, pp. 49–50.

Mowry, Chem. Reviews, vol. 42, pp. 250–251 (1948).